United States Patent [19]

Martino et al.

[11] Patent Number: 4,522,961

[45] Date of Patent: Jun. 11, 1985

[54] AQUEOUS SELF-CURING POLYMERIC BLENDS

[75] Inventors: Phillip C. Martino, Brunswick; Peter P. Winner, North Royalton, both of Ohio

[73] Assignee: SCM Corporation, New York, N.Y.

[21] Appl. No.: 575,287

[22] Filed: Jan. 30, 1984

Related U.S. Application Data

[63] Continuation-in-part of Ser. No. 468,364, Feb. 22, 1983, abandoned.

[30] Foreign Application Priority Data

| Aug. 10, 1983 | [FI] | Finland | 832883 |
| Aug. 10, 1983 | [NZ] | New Zealand | 205206 |
| Aug. 11, 1983 | [AU] | Australia | 17909/83 |
| Aug. 11, 1983 | [CA] | Canada | 434383 |
| Aug. 11, 1983 | [DK] | Denmark | 3659/83 |
| Aug. 11, 1983 | [EP] | European Pat. Off. | 83304656.8 |
| Aug. 11, 1983 | [KR] | Rep. of Korea | 3754/83 |
| Aug. 11, 1983 | [MX] | Mexico | 198360 |
| Aug. 11, 1983 | [NO] | Norway | 832885 |
| Aug. 11, 1983 | [PT] | Portugal | 77186[U] |
| Aug. 11, 1983 | [ZA] | South Africa | 83/5923 |
| Aug. 11, 1983 | [ES] | Spain | 524.884 |
| Aug. 12, 1983 | [IE] | Ireland | 1907/83 |
| Aug. 12, 1983 | [JP] | Japan | 58-146741 |
| Aug. 18, 1983 | [TW] | Taiwan | 7212830 |
| Aug. 31, 1983 | [VE] | Venezuela | 1343 |

[51] Int. Cl.$^3$ .................. C08L 63/00; C08L 51/00
[52] U.S. Cl. ................... 523/407; 523/403; 523/404; 523/411
[58] Field of Search ............ 523/407, 411, 403, 404

[56] References Cited

U.S. PATENT DOCUMENTS

| 3,991,216 | 11/1976 | Christenson et al. | 426/216 |
| 4,097,438 | 6/1978 | Christenson et al. | 523/100 |
| 4,169,086 | 9/1979 | Nolken | 524/131 |
| 4,212,781 | 7/1980 | Evans et al. | 523/403 |
| 4,289,812 | 9/1981 | Martin | 427/379 |
| 4,305,859 | 12/1981 | McEwan et al. | 260/29.6 TA |
| 4,316,922 | 2/1982 | Perine et al. | 428/35 |
| 4,397,970 | 8/1983 | Campbell et al. | 525/524 |

Primary Examiner—Paul R. Michl
Assistant Examiner—A. H. Walker
Attorney, Agent, or Firm—Thomas M. Schmitz

[57] ABSTRACT

The invention pertains to coating compositions comprising self-curing water-dispersed polymers, epoxy-acrylic copolymers, and preferably including epoxy phosphate polymers. The self-curing water-dispersed polymers produced preferably by step-wise polymerization of ethylenically unsaturated monomers comprising alkylol acrylamide monomer, functional monomers, and other monomers, wherein the alkylol acrylamide monomers are copolymerized in the second stage monomer addition to preferentially locate alkylol acrylamide groups in the surface portion of the latex polymer particles. Melamine resins can be added to improve the cure properties of the coating composition. The coating compositions are advantageously sprayable compositions and are particularly useful for interior coatings for food and beverage containers.

77 Claims, No Drawings

AQUEOUS SELF-CURING POLYMERIC BLENDS

BACKGROUND OF THE INVENTION

This is a continuation in part of Ser. No. 468,364 filed Feb. 22, 1983, now abandoned and the same are incorporated herein by reference.

This invention relates to polymeric compositions and processes particularly useful in surface coating compositions, and more particularly pertains to aqueous blends containing certain reactive self-curing water-dispersed polymers, water-dispersed epoxy-acrylic copolymers, and preferably containing a polymeric phosphate additive, to provide useful water-based coating compositions for interior beverage and food containers and similar sanitary coating applications.

Water-based coating compositions for use as internal sanitary liners for metal containers are suggested in U.S. Pat. No. 3,991,216. Such polymers are based on interpolymers of copolymerized acrylamide monomer, carboxylic monomer, and other ethylenically unsaturated monomers. However, such polymers are difficult to spray and often exhibit deficient film properties such as lack of resistance to ethanol and hence are undesirable for containers for alcoholic beverages.

Epoxy resins are particularly desirable for use in surface coating materials as a vehicle or polymeric binder for pigments, fillers, and other additives whereby epoxy resins advantageously provide toughness, flexibility, adhesion, and chemical resistance. Water-dispersed coating compositions containing epoxy resins are highly desirable for can coating compositions. Coatings for soft drink and beer cans, for instance, are critical due to taste sensitivity wherein such sanitary can coatings must not alter the product taste of canned beverages. Taste problems can occur in a variety of ways such as by leaching of coating componenets into the beverage, or by adsorption of flavor by the coating, or sometimes by chemical reaction, or by some combination thereof. In commonly assigned U.S. Pat. No. 4,212,781, a process is disclosed for modifying epoxy resin by reacting the epoxy resin with addition polymerizable monomer in the presence of at least 3% by weight of benzoyl peroxide (or the free radical inititiating equivalent thereof) based on monomer at a suitable reaction temperature. This reaction produces a reaction mixture containing an in-situ formed blend of resinous materials comprising an epoxy-acrylic copolymer mixture containing epoxy resin, graft epoxy-acrylic polymer, and associatively-formed ungrafted addition polymer. The in-situ polymerized monomers include acid functional monomers to provide acid functionality in the reaction mixture sufficiently high to effect stable dispersion of the resulting reaction product in a basic aqueous medium. In a preferred embodiment of U.S. Pat. No. 4,212,781, a polyglycidyl ether of bisphenol-A is reacted with a mixture of addition polymerizable monomers containing an acrylic such as methacrylic acid. The epoxy resin has a molecular weight above 4,000 and provides from 50% to 90% of the initial reaction mixture. The reaction takes place in the presence of benzoyl peroxide at an elevated temperature above 80° C. and preferably between about 110° C. and 130° C. to effect addition polymerization of the monomer and produce addition polymer grafted to the epoxy resin. The reaction product can be dispersed in a basic aqueous medium to form a water-reducible epoxy-acrylic copolymer mixture.

It now has been found that certain reactive self-curing water dispersed polymers blended with an epoxy-acrylic copolymer mixture and preferably with a phosphated polymer provides an excellent sprayable coating suitable for an interior coating for beverage and food containers. The reactive self-curing water-dispersed polymer contains copolymerized monomers including functional carboxyl, hydroxyl, amine, or amide monomers in combination with alkylol acrylamide monomer. The monomers preferably are polymerized in a stepwise reaction to concentrate the alkylol acrylamide on the surface of the water dispersed polymer particles to provide an improved stabilized water-dispersed polymer exhibiting surprisingly good rheological properties including viscosity, stability and spray application. By concentrating alkylol acrylamide on the polymer surface and by polymerizing at temperatures preferably above 70° C., it is believed that a minor amount of alkylol acrylamide reacts and cross-links with a minor amount of functional monomer during the addition polymerization of ethylenic monomers to provide a relatively rigid or hard polymer particle surface, which apparently stabilizes the viscosity of the water-dispersed blend as well as provide considerable shear resistance during subsequent spray application of the polymeric blend. Preferred water dispersed polymers are emulsion polymers. Upon ultimately heat curing of the composition of this invention, the self-curing water-dispersed polymer becomes self-curing by the alkylol acrylamide reacting with the functional monomer groups in the polymer. By blending the reactive self-curing water-dispersed polymer with a water-dispersed epoxy-acrylic copolymer, the blend provides an excellent sprayable interior coating particularly suitable for beverage cans. Preferred epoxy-acrylic copolymers are graft copolymers. A preferred polymeric blend in accordance with this invention comprises an aqueous dispersed phosphated polymer blended with the reactive self-curing polymer and the epoxy-acrylic copolymer. Preferred phosphated polymers are epoxy phosphate polymers. The inclusion of phosphated polymer provides improved coating characteristics such as solvent resistance and improved porosity properties. The polymeric compositions of this invention provide improved viscosity stability, improved mechanical stability, and surprisingly good rheological properties including spray application. Coatings based on the polymeric composition exhibit high solids, minimal use of solvents, good spray application and form films having good film integrity properties. The reactive self-curing water-dispersed polymers are high molecular weight polymers and advantageously provide good film integrity properties, high solids content, good spray application, and minimal use of solvents. These and other advantages of this invention will become more apparent by referring to the detailed description of the invention and the illustrative examples.

SUMMARY OF THE INVENTION

Briefly, the invention is based on a certain self-curing water dispersed polymers produced by polymerizing ethylenic monomers, including functional carboxyl, hydroxyl, amine or amide monomers in combination with alkylol acrylamide monomers, and thereafter blending the water-dispersed polymer with an epoxy-acrylic copolymer and preferably with a phosphated polymer. Preferably, the alkylol acrylamide monomer is reacted in the latter step of a two-step process to preferentially locate the alkylol acrylamide on the surface of the water dispersed polymer particles. Most preferably, the alkylol acrylamide monomer is reacted in the second step at temperatures above about 70° C. to promote coreaction and crosslinking with functional monomer. The composition of this invention comprises a water-dispersed polymeric blend of (a) the reactive self-curing water dispersed polymer, and (b) an epoxy-acrylic copolymer. The preferred composition further contains (c) phosphated polymer. An aminoplast cross-linking resin can be added to the water-dispersed polymeric blend to provide improved curing properties.

DETAILED DESCRIPTION OF THE INVENTION

In accordance with this invention, the composition comprises certain reactive self-curing water dispersed polymers blended with epoxy-acrylic copolymer, preferably including a phosphated polymer, and an aminoplast cross-linking resin.

Referring first to the reactive self-curing water dispersed polymer, the reactive self-curing polymer preferably is an emulsion polymer containing copolymerized ethylenically unsaturated monomers comprising (i) alkylol acrylamide and preferably alkylated alkylol acrylamide monomers, (ii) functional monomers consisting of reactive carboxy, hydroxyl, amine, or amide monomers, and (iii) other ethylenically unsaturated monomers to produce self-reactive alkylol acrylamide water dispersed polymer. The self-curing water dispersed polymer preferably is synthesized by step-wise polymerization of monomers in water by first polymerizing a portion of the ethylenic monomers to form a core polymer particle, and then polymerizing the remaining monomers including alkylol acrylamide monomer in the second polymerization step. A minor amount of alkylol acrylamide reacts and crosslinks with a minor amount of functional monomer to provide surface polymer crosslinking. The polymer particles further contain non-crosslinked alkylol acrylamide preferentially orientated on the surface of the polymer particles, whereby the water dispersed polymers are self-curing. The two stage monomers can be proportioned on a weight basis from 25/75 to 75/25 first stage/second stage monomers. Preferably, the second stage should contain monomers already included in the first stage, plus 3–15% alkylol acrylamide derivative based on total monomer in both stages. Preferably, monomer composition of the two stages are similar, particularly with respect to the carboxyl monomer level and the polymer Tg, which will insure compatability between the two monomer stages and preclude unnecessary agglomeration during syntheses.

The alkylated alkylol acrylamide monomers can be derivatives of acrylamide, methacrylamide, methylol acrylamide, or similar alkyl modified acrylamide monomer as shown for example in U.S. Pat. No. 3,991,216; U.S. Pat. No. 4,097,438; and U.S. Pat. No. 4,305,859. The acrylamide monomers preferably are alkylated with an alkyl group such as methyl, ethyl, propyl, n-butyl, or iso-butyl, and similar alkylated alkylol acrylamide monomers, wherein the butylated monomers are preferred. Functional monomers include carboxyl, hydroxyl, amino, and amido functional group containing monomers. Carboxy containing monomers include acrylic acid and lower alkyl substituted acrylic acids wherein the preferred carboxylic monomers are acrylic and methacrylic acids. Hydroxyl containing monomers are hydroxy containing ethylenically unsaturated monomers including hydroxy alkyl acrylates such as 2-hydroxy ethyl acrylate and methacrylate, 2-hydroxypropyl acrylate and methacrylate, and similar hydroxy alkyl acrylates. Amido containing monomers include acrylamide and methacrylamide or similar alkyl alkylol acrylamide monomers.

The remaining other ethylenically unsaturated monomers that can be copolymerized with the alkylol acrylamide monomer and functional monomers to form the reactive water dispersed polymer, comprise ethylenic double bond unsaturated monomers including vinyl, vinylidene, acrylic, allylic and unsaturated mono or dicarboxylic acids. Vinyl monomers include, for example, vinyl esters such as vinyl acetate, vinyl proprionate, vinyl butyrates, vinyl benzoate, isopropenyl acetate and similar vinyl esters; and vinyl halides such as vinyl chloride. Vinyl aromatic hydrocarbon monomers can include, for example, styrene, methyl styrenes and similar alkyl styrenes, chlorostyrene, vinyl toluene, vinyl naphthalene, divinyl benzene, diallyl phthalate and similar diallyl derivatives. Vinyl aliphatic monomers include olefinic unsaturated monomers such as butadiene, substituted butadienes, cyclopentadienes, dicyclopentadiene, cyclohexene, and vinyl naphthalene. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl, and cresyl glycidyl ethers reacted with acrylic and methacrylic acids, hydroxyl alkyl acrylates and methacrylates such as hydroxyethyl and hydroxypropyl acrylates and methacrylates, as well as amino acrylates and methacrylates.

The reactive self-curing alkylol acrylamide water dispersed copolymer preferably is a copolymer prepared by copolymerizing the ethylenically unsaturated monomers in water by two step polymerization described above through free radical induced polymerization using peroxy or azo catalyst, common redox catalyst, ultraviolet radiation or the like. Free radical initiators for example include various peroxygen compounds such as persulfates, benzoyl peroxide, t-butyl hydroperoxide, cumene hydroperoxide, and similar peroxide catalysts. Azo compounds include for example azo bis-isobutyronitrile and dimethylazobis-isobutyrate. Initiating systems further include alkali metal persulfate or ammonium persulfate with or without a reducing substance adapted to activate the persulfate. The initiators or catalysts ordinarily are used at a level of about 0.1% to 1% by weight of monomers. The resulting self-curing water dispersed polymer contains by weight between 1% and 20% copolymerized alkylol acrylamide monomer, between 1 and 20% reactive carboxyl, hydroxyl, amine or amide monomer, and the remaining being other ethylenically unsaturated monomers.

Water dispersed polymers preferably are emulsion polymers produced by emulsion polymerization in the presence of an emulsifier although similar aqueous polymerization processes can be used. Most preferred polymers are latex polymers. The two monomer stages are sequentially emulsion copolymerized during 6–8 hours at temperatures above 70° C. and preferentially between 70°–80° C. utilizing standard semi-continuous methodology. Monomer conversion is routinely above 99.8% and the final non-volatile content is usually 45–55%. The preferred particle size is 2000–4000 Å for optimum spray performance, although this range can be expanded for other application purposes since particle size has been found to have little effect upon coatings performance. Polymer Tg is important for spray application characteristics and the Tg should be between about 0° C. and 70° C. Other useful water dispersed polymers can be produced by copolymerization of the monomers in water containing an ionizing agent to produce a resinous polyelectrolyte water dispersed polymer as described in U.S. Pat. No. 4,218,356. This process comprises reacting together monomers including ionizable functional monomers such as carboxyl or hydroxyl monomers in the presence of an ionizing agent and in the presence of a minor amount of solvent for the monomers. Ionizing agents for carboxyl monomers are typical primary, secondary, or tertiary amines whereas ionizing agents for cationic monomers typically include lower alkyl organic acids or mineral acids.

Referring next to the epoxy-acrylic copolymer, the epoxy-acrylic copolymer is a graft copolymer comprising epoxy resin coreacted with monomers including acrylic monomers to produce an epoxy-acrylic graft copolymer. The preferred epoxy-acrylic copolymer comprises an epoxy-acrylic graft copolymer containing epoxy resin, epoxy-acrylic graft copolymer, and ungrafted addition polymer produced by polymerizing ethylenically unsaturated monomers in-situ with epoxy resin in the presence of a benzoyl peroxide (or equivalent) as more particularly set forth in U.S. Pat. No. 4,212,781, and said patent is incorporated herein by reference. The in-situ polymerization of monomers generally comprises reacting the ethylenically unsaturated monomers in the presence of epoxy with at least 3% of benzoyl peroxide by weight of the monomer. The in-situ formed carboxyl-functional polymer can have a molecular weight between 5,000 and 20,000 and preferably between 7,000 and 15,000. The carboxyl content (—COOH) should comprise at least 2% by weight of the monomer mixture and preferably should be above 5%.

The acrylic portion of the epoxy-acrylic copolymer comprises polymerized ethylenically unsaturated monomers which include carboxyl functional monomers such as acrylic acid and lower alkyl substituted acrylic acids such as methacrylic acid to provide carboxyl functionality means for dispersing the epoxy-acrylic copolymer mixture into water. The preferred acrylic acid is methacrylic acid. The balance of the monomers preferably are nonreactive under the contemplated conditions of polymerization, although small amounts of other reactive monomers may be used such as hydroxy monomers illustrated by 2-hydroxy ethyl methacrylate, amide monomers illustrated by acrylamide, or N-methylol monomers illustrated by N-methylol acrylamide. The remaining monomers are nonreactive but copolymerizable monomers illustrated by acrylate and methacrylate esters, such as ethyl acrylate, methyl methacrylate or isobutyl methacrylate, styrene, or vinyl toluene, vinyl acetate, vinyl chloride, vinylidene chloride, acrylonitrile, and generally alkyl esters of an acrylic acid, generally the lower alkyl esters, that is, those esters in which the esterifying group contains from 1 to 4 carbon atoms, and particularly ethyl acrylate. Other useful monomers in this class include other $C_{1-15}$ alkyl acrylate esters and methacrylate esters such as, for example, propyl acrylate, isopropyl acrylate, butyl acrylate, isobutyl acrylate, tertiary butyl acrylate, pentyl acrylate, decyl acrylate, lauryl acrylate, isobornyl acrylate, methyl methacrylate, butyl methacrylate, isobutyl methacrylate, hexyl methacrylate, 2-ethyl hexyl methacrylate, octyl methacrylate, and nonyl methacrylate. Other useful monomers are those readily commercial available monomers having vinyl unsaturation and include styrenic monomers such as styrene, vinyl toluene, divinyl benzene, isoprene and butadiene.

The epoxy resin portion of the epoxy-acrylic copolymer mixture can be either aliphatic or aromatic, although the aromatic epoxy resins are preferred. The most preferred epoxy resins are polygylcidyl ethers of bisphenol-A, especially those having 1,2-epoxy equivalency of from about 1.3 to about 2. The molecular weight should be from about 350 to about 20,000, and preferably, for sanitary coating compositions, from about 4,000 to about 10,000. Mixtures of monoepoxides and diepoxides are desirable. Another procedural variations is the introduction of the aromatic polyether which is devoid of oxirane functionality by reacting epoxide groups with benzoic acid, phenol or similar monoreactive epoxide blocking agent. In preferred practice, the epoxy resin is a mixture including aromatic polyether devoid of oxirane functionality, aromatic polyether having a single oxirane group, and aromatic polyether having two oxirane groups. This mixture of epoxy functionality maximizes compatibility, although the aromatic polyether devoid of oxirane functionality can be added later, and the mixture can be heated and agitated to enhance the intimacy of the association between the various components. As a further variation, the epoxy resin can be an epoxy phosphate produced by coreacting the epoxy resin with phosphoric acid to provide an epoxy phosphate ester containing between 0.05% and 5% coreacted phosphate based on the weight of epoxy resin. Thereafter, the epoxy phosphate can be coreacted with ethylenic monomers including acrylic monomers for example to produce a phosphated epoxy-acrylic graft copolymer.

The preferred graft epoxy-acrylic copolymer mixture is prepared by in-situ polymerization of the ethylenic monomers with epoxy resin. The epoxy resin can be heated in a reactor wherein the polymerizable monomer can be added slowly over a period of at least two or three hours along with a solvent and a free radical initiator. Although the reaction may be conducted in the absence of solvent, a solvent system is preferred for the in-situ polymerization of monomers in the presence of epoxy resin. A preferred solvent system comprises two miscible solvents, one of which dissolves the epoxy resin and the other of which dissolves the monomers. The particular solvents satisfactory for the epoxy resin are solvents such as xylene, benzene, ethyl benzene, toluene, and the alkoxy alkanols. For the monomer, alcohols such as methanol, ethanol, propanol, butanol, and the like, are suitable, with butanol being preferred. Ethylene glycol monobutyl ether, ethylene glycol monobutyl ether acetate, and the like, hexane, mineral spirits, and the like, are also suitable. For subsequent dispersion into water, the solvents selected should be water-soluble materials, as are acetone, butanol, ethanol, propanol, ethylene glycol monoethyl ether, and the like. Ordinarily the amount of solvent may be in the range from about 5% to 30% by weight of the sum of the other componenets. In practice, the epoxy resin and the mixture of polymerizable monomers are reacted together in the presence of a free radical initiator, preferably of the peroxide type, and benzoyl peroxide is most preferred. Typical and useful free radical initiators include cumene hydroperoxide, benzoyl peroxide, t-butyl perbenzoate, t-butyl peroxide, lauroyl peroxide, methyl ethyl ketone peroxide, chlorobenzoyl peroxide, and the like. Benzoyl peroxide is preferred as the free radical initiator for use in the practice of the present invention. The amount of free radical catalyst is expressed in terms of percentage by weight of benzoyl peroxide based on the total weight of the polymerizable monomer, or equivalent, at the temperature of use. The amount of catalyst should be at least 3%, and preferably more than 4% by weight of benzoyl peroxide or equivalent based on monomer weight. The reaction temperature preferably is maintained in the range from about 80° C. to about 130° C., although the temperature may be adjusted within a relatively wide range to accommodate the reactivity of the mixture. Thus, operating temperatures in the range from about 30° C. to about 200° C. are feasible, depending upon the end results and operating conditions selected. After the monomers are added, the reaction mixture is normally held for up to three hours at reaction temperature to complete the monomer conversions. The in-situ polymerization of the monomers produces an in-situ formed carboxyl functional polymer containing at least about 20% of polymerized monoethylenically unsaturated carboxylic acid monomer based on the total weight of monomers as well as epoxy-acrylic graft polymer and ungrafted epoxy resin, as more particularly set forth in U.S. Pat. No. 4,212,781.

The epoxy-acrylic graft copolymer also can be an epoxy-acrylic ester graft copolymer produced from previously described epoxy resin and copolymerized monomers including carboxyl monomers wherein the epoxy-acrylic ester graft copolymer comprises acidic or carboxylic copolymer esterified with epoxy resin. The epoxy-acrylic ester graft copolymer can be produced by esterifying a solvent-soluble carboxy functional polymer with an epoxy resin wherein the esterification reaction is carried out preferably in an organic solvent and in the presence of sufficiently high amounts of amine catalyst to produce a nongelled epoxy ester graft copolymer. The esterification reaction is carried out in the presence of amine catalyst in sufficient amounts greater than catalyic amounts of 0.3% to avoid gellation and preferably in the presence of greater than 2% amine esterification catalyst based on the weight of reactants subjected to esterification to produce an epoxy-acrylic ester graft copolymer. The preformed acrylic polymer preferably comprises copolymerized ethylenically unsaturated monomers including at least about 20% by weight of copolymerized monoethylenically unsaturated carboxylic acid monomer based on the total weight of copolymer to produce a carboxyl functional prepolymer. The epoxy resin portion comprises at least about 40% of the epoxy-acrylic ester polmer and provides an oxirane functionality in a stoichiometric deficiency with respect to carboxyl functionality in the carboxyl preformed polymer in a ratio of about 1:2 to 1:20 whereby the excess carboxyl functionality in the epoxy-acrylic ester provides a means for dispersing the polymer into water by reacting with a base to render the reaction product self-emulsifiable into water, as further described in detail in copending application Ser. No. 222,933 filed Jan. 6, 1981, now U.S. Pat. No. 4,480,058 and EPO publication Ser. No. 0 006 334 published Jan. 9, 1980. Still a further variation of the epoxy-acrylic graft copolymer can comprise forming a preformed carboxylic polymer of polymerized ethylenic monomers including carboxyl monomers in the presence of melamine resin followed by reacting the preformed carboxylic polymer with epoxy resin in the presence of high amounts of amine as suggested in U.S. Pat. No. 4,289,811 to form an epoxy-acrylic ester graft copolymer.

Referring next to the preferred inclusion of a phosphated polymer in the polymeric blend of this invention, the phosphated polymer can include for example, mono- and di-alkyl esters of phosphoric acid, phosphated epoxidized oil, phosphated epoxidized polybutadiene copolymers, phosphated acrylic copolymers, phosphated polyesters, phosphated copolymers containing copolymerized phosphate monomer, epoxy phosphate, and phosphated epoxy-acrylic copolymer.

The preferred phosphated polymer is a phosphated epoxy polymer and comprises epoxy resin coreacted with phosphoric acid to produce a phosphated epoxy ester polymer. The phosphated epoxy polymer contains on an equivalent basis at least about 0.1 equivalent of phosphate per equivalent of epoxide and preferably between about 0.1 to 1 equivalent of phosphate per epoxide equivalent on the epoxy polymer. Thus, a mole of monoepoxide polymer can contain up to about 1 mole of phosphate whereas a mole of a diepoxide polymer can contain up to 2 moles of phosphate. On a weight basis, the phosphated epoxy polymer contains between about 0.05% and 5%, and preferably between 0.1% and 3% coreacted phosphoric acid, although excess molar amounts of phosphate reactant in any appreciable amount is undesirable. The epoxy polymer used for preparing the phosphated epoxide can be epoxy polymers having a molecular weight greater than 200 and up to about 10,000 and preferably between about 400 and 8,000. The epoxy polymer can be conventional epoxy polymers produced by a condensation reaction of epichlorohydrin or dichlorohydrin with bisphenols or polyhydric phenols, polyalcohols, polyfunctional halohydrins, and certain polyepoxides. Monoepoxides such as phenyl glycidyl ether are suitable although diepoxides are preferred. The preferred epoxy polymers are produced by coreacting epichlorohydrin or dichlorohydrin with bisphenol-A to provide linear epoxy polymers having pendant epoxide groups. The most preferred epoxy polymers are epichlorohydrin reacted with bisphenol-A. The epoxy polymer can contain between 2 and 25 monomer units and preferably between 3 and 20 copolymerized monomer units (bisphenol-A) wherein the epoxy polymer can be either a mono or diepoxide polymer. The phosphated epoxide polymer can be synthesized by heating a solution of epoxy resin dispersed in a suitable solvent such as methyl ethyl ketone or 2-butoxy ethanol and then reacted with phosphoric acid or preferably polyphosphoric acid at reflux temperatures of 120° C. to 145° C. for sufficient time, typically 2 to 5 hours, to completely react the phosphoric acid with available epoxide groups. The preparation of epoxy phosphate resins are shown in U.S. Pat. No. 4,289,812 and U.S. Pat. No.

4,316,922. The epoxy phosphate can be prepared from a single epoxy resin or from a mixture of epoxy resins. In a further variation of this aspect of the invention, the epoxy phosphate polymer can be produced by reacting a non-phosphated epoxy resin with an epoxy resin containing higher levels of phosphate, provided that the resulting epoxy resin mixture contains between about 0.05% and 5% by weight coreacted phosphoric acid. For instance, a weight ratio of 9 parts non-phosphated epoxy resin mixed with 1 part phosphated (10%) epoxy resin coreacted together at temperatures above 120° C. for at least 2 hours provides an phosphated epoxy polymer containing 1% coreacted phosphoric acid in accordance with this invention. In practice, the non-phosphated epoxy resin is reacted with phosphated (10%) epoxy resin at sufficiently high temperatures for time sufficient to convert the mixture to predominately a monophosphate, which can be enhanced by the addition of 2% water based on solids to hydrolyze the phosphated mixture and preferably convert the mixture to a predominately monophosphated epoxy resin. The phosphated epoxy polymer containing between 0.05% and 5% coreacted phosphoric acid in accordance with this invention then can be dispersed into an amine and water mixture by mechanical mixing. The resulting aqueous dispersed epoxy phosphate can be added to the epoxy-acrylic copolymer and the self-curing water dispersed polymer in accordance with a preferred aspect of this invention.

Other suitable phosphated polymers include phosphated esters of alkyl alcohol, phosphated resinous polyelectrolyte polymer, phosphated epoxidized oils, phosphated epoxidized polybutadiene copolymers, phosphated addition copolymers containing copolymerized phosphate monomer, phosphated addition polymer of copolymerized monomers, phosphated polyester, and phosphated epoxy-acrylic copolymer. The phosphated polymers preferably contain less than 5% coreacted phosphoric and ordinarily between 0.05% and 5% phosphoric based on the weight of the phosphated polymer provided that the phosphated polymer does not contain appreciable amounts of excess molar phosphate reactant, and preferably, does not contain any free unreacted phosphate.

Phosphated esters of alkyl alcohol can comprise a mixture of mono- and di-alkyl esters of phosphoric acid produced by reacting phosphoric acid with aliphatic alcohols containing between 2 and 20 carbon atoms and preferably between 4 and 8 carbon atoms as suggested in U.S. Pat. No. 2,005,619. Other ester dispersed phosphated copolymers can be produced by polymerizing monomers in water containing an ionizing agent and a minor amount of organic cosolvent such as suggested in U.S. Pat. No. 4,218,356 wherein the polymers are phosphated. The water dispersed phosphated copolymers can comprise an aqueous dispersion of a resinous polyelectrolyte formed by the addition polymerization in water of ethylenically unsaturated monomers, including at least a portion of the monomers having functional groups ionizable in water such as carboxyl groups, wherein the water contains an ionizing agent for neutralizing at least a portion of the functional groups in the resulting copolymer, as set forth in U.S. Pat. No. 4,218,356. The phosphated resinous polyelectrolyte can be produced by providing an aqueous medium containing a cosolvent, adding the ionizing agent in advance of or concurrently with the monomers, polymerizing the monomers by free-radical polymerization until the water-dispersed resinous polyelectrolyte is formed, and then phosphating the remaining oxirane groups to produce water-dispersed polymer.

Phosphated epoxidized oil can comprise a phosphated ester of epoxidized oil or epoxidized polybutadiene copolymer by reacting the epoxidized polymer with up to about 5% phosphoric acid. Phosphated acrylic copolymers can be produced by reacting an acrylic copolymer containing oxirane or hydroxy functionality with phosphoric acid. The acrylic copolymer can be produced by reacting ethylenically unsaturated monomers, particularly including glycidyl acrylate or methacrylate or hydroxy functional monomers as well as other ethylenically unsaturated monomers such as methyl methacrylate, butyl methacrylate, hexyl methacrylate, octyl methacrylate, isodecyl methacrylate, stearyl methacrylate, methyl acrylate, ethyl acrylate, butyl acrylate, hexyl acrylate, 2-ethylhexyl acrylate, octyl acrylate, decyl acrylate and dodecyl acrylate, substituted alkyl esters, for example, hydroxyalkyl esters such as hydroxyethyl and hydroxypropyl acrylate and methacrylate, styrene, alpha-methyl styrene, alpha-chloro styrene and vinyl toluene. Phosphated acrylic copolymers comprise phosphoric acid reacted with acrylic copolymer containing oxirane or hydroxy functionality wherein the acrylic copolymer comprises copolymerized ethylenic monomers including glycidyl acrylate or methacrylate or hydroxyl functional monomer.

Phosphated polyesters can be hydroxy terminated polyesters reacted with phosphoric acid wherein the polyesters ordinarily are dicarboxylic saturated or unsaturated acid esterified with simple glycols. Glycols include ethylene glycol, propylene glycol, diethylene glycol, dipropylene glycol, 1,3 or 1,4 butanediol, hexanediols, as well as minor amounts of polyols such as pentaeryethritol, triethylene glycol, trimethylol propane, or glycerol. The unsaturated dicarboxylic acid component can be alpha-beta unsaturated dicarboxylic acids or anhydrides such as maleic, fumaric, itaconic or the like. Saturated dicarboxylic acids or anhydrides include phthalic anhydride or acid, terephthalic acid, isophthalic acid, adipic acid, sebacic acid, succinic acid or similar saturated acids or anhydrides. Monocarboxylic acids or fatty acids can be added to a minor amount and can include lower alkyl acids as well as lauric acid, palmitic acid, myristic acid and stearic acids. The hydroxyl terminated polyester is produced by reacting excess equivalents of glycol and polyol with lesser equivalents of carboxylic acid whereupon the excess hydroxyl groups are phosphated with phosphoric acid. Similarly, polyester containing terminal glycidyl groups can be reacted with phosphoric acid to produce a phosphated polyester.

Phosphated addition copolymers can be produced by copolymerizing ethylenic monomers with a phosphated hydroxy ethyl acrylate or similar phosphated monomers. Phosphated copolymer based on copolymerization of ethylenically unsaturated monomers in combination with phosphated ethylenically unsaturated monomer can be produced by polymerizing the ethylenic monomers previously described with the phosphate monomer in an aqueous polymerization process such as emulsion, suspension, aqueous ionic resinous polyelectrolyte dispersion, microemulsion azeotropic and similar process previously described herein. Phosphated epoxy-acrylic copolymers can be produced by reacting ethylnic monomers including ethylenic carboxyl monomers in the presence of epoxy phosphate resin by in-situ polymerization to produce phosphated epoxy graft copolymer. Other phosphated epoxy-acrylic copolymers can be produced by reacting epoxy resin with pre-formed acrylic carboxyl copolymer in the presence of high amounts of amine to produce an epoxy-acrylic ester copolymer.

A highly desirable sprayable coating composition can be produced based on a self-curing water dispersed polymer and an epoxy-acrylic copolymer where preferred compositions further include a phosphated polymer. The most preferred composition comprises a reactive self-curing emulsion polymer as the binder system in the coating along with additive amounts of epoxy-acrylic graft copolymer mixture and epoxy phosphate. The polymeric mixture can broadly contain on a weight basis between 5% and 99% self-curing water dispersed polymer, 1% and 70% epoxy-acrylic copolymer, and 0 and 50% phosphated polymer. Preferred coating compositions of this invention contain a polymer blend on a weight basis comprising between 40% and 99% reactive self-curing water dispersed polymer, between about 1% and 30% epoxy-acrylic copolymer, and between 0% and 30% and preferably 3% and 20% phosphated polymer. The foregoing matrix polymer compositions are then mixed with a water-dispersed cross-linking component generally referred to as aminoplast resins adapted to heat cure and cross link with the carboxyl functionality of the epoxy-acrylic copolymer mixture. On a polymer weight basis, the coating composition contains between 0% and 15% but preferably between 1% and 10% aminoplast cross-linking resin mixed with between 85% and 100% of the above-indicated matrix polymer compositions. Molecular weights of polymers are weight average molecular weights and ordinarily can be measured by gel permeation chromatography (GPC) as set forth in ASTM D 3016-72 and ASTM D 3593-80.

Referring next to the aminoplast cross-linking resins, aminoplasts are melamine or melamine derivatives such as methylol melamine or similar alkylated melamine formaldehyde resins. Aminoplasts further include benzoguanamine, acetoguanamine, as well as ureaformaldehyde. Commercially available aminoplasts which are water-soluble or water-dispersible for the instant purpose include Cymel 301, Cymel 303, Cymel 370, and Cymel 373 (all being products of American Cyanamid, Stamford, Conn., said aminoplasts being melamine based, e.g., hexamethoxy-methyl melamine for Cymel 303), and Beettle 80 (products of American Cyanamid which are methylated or butylated ureas.) Other suitable aminoplast resins are of the type produced by the reaction of aldehyde and formal guanamines; ammeline; 2-chloro-4,6-diamine-1,3,5-triazine; 2-phenyl-p-oxy-4,6-diamino-1,3,5-tri-azine; and 2,4,6-triethyl-triamino-1,3,5-triazine. The mono, di-, or tri-aryl melamines, such as 2,4,6-triphenyl-triamino-1,3,5-triazine, are preferred. Other aldehydes used to react with the amino compound to form the resinous material are crotonic aldehyde, acrolein, or compounds which generate aldehydes, such as hexamethylene-tetramine, paraldehyde, and the like.

The water-dispersed coating compositions can be produced by mixing together the various water-dispersed polymers. The self-curing water dispersed polymer is prepared in aqueous medium. The aminoplast polymer can be dispersed into water by mechanical mixing. The epoxy-acrylic copolymer and phosphate polymer are prepared in solvent and then subsequently dispersed into water using a fugitive base such as primary, secondary, and tertiary alkyl, alkanol, aromatic amines, or alkanolalkyl mixed amines such as monoethanol amine, dimethyl ethanol amine, diethanol amine, triethyl amine, dimethyl aniline, ammonium hydroxide, and the like, as more particularly described in U.S. Pat. No. 4,212,781. Most preferred compositions comprise self-curing emulsion polymer such as latex, epoxy-acrylic graft copolymer, and epoxy phosphate polymer. The amount of water contained in the coating composition containing the epoxy-acrylic copolymer, the reactive self-curing water dispersed polymer, the phosphate polymer, and the aminoplast resin depends on the viscosity desired, which in turn, relates to the method of application. For spraying, preferably the coating composition contains between about 10% and 30% by weight polymeric solids relative to 70% to 90% water including other volatiles such as minor amounts of solvent. For applications other than spraying, the aqueous polymeric dispersions can contain between about 10% and 40% by weight water. Organic sovents can be utilized to facilitate spray or other application methods and such solvents include n-butanol, 2-butoxy-ethanol-1, xylene, toluene, and preferably n-butanol is used in combination with 2-butoxy-ethanol-1. The coating composition of the present invention can be pigmented and/or opacified with known pigments and opacifiers. For many uses, including food use, the preferred pigment is titanium dioxide. The resulting aqueous coating composition can be applied satisfactorily by conventional methods known in the coating industry. Thus, spraying, rolling, dipping, and flow coating application methods can be used for both clear and pigmented films, although spraying is preferred. After application onto the metal substrate, the coating is cured thermally at temperatures in the range from about 95° C. to about 235° C. or higher for time sufficient to effect complete curing as well as volatilizing of any fugitive component therein. Upon heat curing, the reactive self-curing water dispersed is believed to become reactive and self-curing wherein the alkyl chain of the alkoxy acrylamide splits from the alkylol acrylamide chain whereby the acrylamide chain of the water dispersed polymer reacts with the functional monomer groups of carboxyl, hydroxyl, or amido groups, or can react with the carboxyl or hydroxyl functionality in the epoxy-acrylic copolymer as well as the epoxy phosphate and/or the aminoplast cross-linking resin.

For metal sheet substrates intended as beverage containers and particularly for carbonated beverages such as beer, the coating should be applied at a rate in the range from 0.5 to 15 milligrams of polymer coating per square inch of exposed metal surface. To attain the foregoing, the water-dispersible coating as applied can be as thick as 0.1 to 1 mil.

For a better understanding of the present invention, the following examples are provided. In this application, all parts are parts by weight, all percentages are weight percentages, and temperatures are degrees Centigrade unless otherwise expressly noted.

EXAMPLE 1

Preparation of Self-Curing Latex

A two stage thermosetting acrylic emulsion copolymer containing styrene/ethyl acrylate/methacrylic acid/N-isobutoxy methylol acrylamide was prepared by loading 100 parts of deionized water and 0.80 parts sodium dihexyl sulfosuccinate into the reactor and heating under nitrogen sparge with agitation to 76°–77° C. At equilibriated reaction temperature the nitrogen sparge was removed and 0.10 parts ammonium bicarbonate added. A mixture of 3.0 parts styrene and 2.0 parts ethyl acrylate was then added to the reactor and emulsified 10 minutes, whereupon 0.25 parts ammonium persulfate were added and allowed to react 20 minutes before starting monomer stage number one.

Monomer stage number one contained 33.0 parts styrene, 26.5 parts ethyl acrylate and 3.50 parts methacrylic acid. This monomer stage was added at a constant rate to the reactor so that addition was complete after 3.0 hours. Monomer stage number two consisted of 14.0 parts styrene, 11.5 parts ethyl acrylate, 1.5 parts methacrylic acid and 5.0 parts N-isobutoxy methylol acrylamide, and was added continuously to the reactor during 1.25 hours. After monomer mix number two was completed, the batch was held for 2 hours at the reaction temperature before cooling and filtration.

Monomer stage sizes are not necessarily confined to those described in this example. Satisfactory spray characteristics were obtained when the first stage/second stage ratio was maintained at a weight ratio of between 25/75 and 75/25.

EXAMPLES 2–10

In a manner similar to Example 1, additional self-curing latices were prepared with the alkylol acrylamide in the second monomer stage also resulting in good spray performance.

pounds of bisphenol-A were added with agitation. The reactor then was heated to about 191° over a period of about 2 hours and held there for an additional 2 hours. Periodic testing for viscosity and percent oxirane was made. Target oxirane value was about 0.6% and viscosity at 25° C. between Z and $Z_1$ (Gardner-Holt). When these values were obtained, 135 pounds of 2-butoxy-ethanol-1 were added, followed by 203 pounds of N-butanol. The molecular weight of the epoxy resin at this point was about 5,500 based on oxirane content. In a separate vessel, there was loaded and mixed the following: 64 pounds of methacrylic acid, 40 pounds of styrene, 44 pounds of ethyl acrylate, and 10 pounds of benzoyl peroxide. This monomer mixture was added gradually to the reactor containing the epoxy resin over a period of 2 hours at uniform rate. The reaction temperature was maintained at 118°. Viscosity was checked periodically on samples. The batch was cooled to 85°; its Acid Number on solids was 85.

The resin batch then was fed into an agitated reducing vessel containing a mixture of 1,095 pounds of deionized water (resistivity at least 50,000 ohm-cm) and 57 pounds of dimethylethanolamine. The temperature of the resulting blend was 50°. It was held there for about an hour, then the blend was cooled to below 32° by adding 500 pounds of the cool deionized water.

(B) The Effect of Variation in Composition

In the above example, the amount of benzoyl peroxide employed during the reaction was about 6.8% by weight based upon the monomer mixture. To demonstrate the effect of changes in composition with respect

TABLE 1

| | EXAMPLES 2–10 | | | | | | | | |
|---|---|---|---|---|---|---|---|---|---|
| | Ex. 2 | Ex. 3 | Ex. 4 | Ex. 5 | Ex. 6 | Ex. 7 | Ex. 8 | Ex. 9 | Ex. 10 |
| Alkylol Acrylamide | NMA[1] | NMA | NMA/NiBMA[2] | NiBMA | NiBMA | NiBMA | NiBMA | NiBMA | NiBMA |
| Alkylol Acrylamide in Second Stage | 2.0 | 3.0 | 1.0/5.0 | 5.0 | 10.0 | 10.0 | 10.0 | 10.0 | 15.0 |
| Carboxyl Monomer Level | 4.0 | 5.0 | 5.0 | 5.0 | 3.0 | 5.0 | 4.0 | 10.0 | 5.0 |
| Additional Functional Monomer | HEA[3] | none | none | none | none | HEA | none | none | none |
| Additional Functional Monomer Level | 3.0 | | | | | 5.0 | | | |
| Polymer Tg | 20° | 30° | 40° | 40° | 30° | 20° | 30° | 50° | 30° |
| Other Monomers | 91.0 | 92.0 | 89.0 | 90.0 | 87.0 | 80.0 | 86.0 | 80.0 | 80.0 |

[1] N—Methylol Acrylamide
[2] N—Isobutoxy Methylol Acrylamide
[3] Hydroxy Ethyl Acrylate

EXAMPLES 11–13

In contrast to Examples 1–10, latices were prepared containing an equal quantity of alkylol acrylamide in both monomer stages resulting in poor spray performance.

TABLE 2

| | Ex. 11 | Ex. 12 | Ex. 13 |
|---|---|---|---|
| Alkylol Acrylamide | NiBMA | NiBMA | NiBMA |
| Alkylol Acrylamide in Second Stage | 3.0 | 5.0 | 10.0 |
| Carboxyl Monomer Level | 5.0 | 5.0 | 5.0 |
| Polymer Tg | 30 | 40 | 50 |

EXAMPLE 14

(A) Preparation of Epoxy-Acrylic Copolymer Mixture

A plant batch was prepared according to the following procedure: 231 pounds of epoxy resin (DER-333) were heated in an agitated reactor to about 82°; 117 to proportions of the epoxy resin and the several monomers in the monomer mixture, several variations were made in Table 3 below.

TABLE 3

| Visc.[1] | Epoxy Resin | MAA[2] | ST[3] | EA[4] | Acid Number |
|---|---|---|---|---|---|
| U | 70 | 13 | 8 | 9 | 85 |
| $Z-Z_1$ | 30 | 13 | 34 | 23 | 85 |
| $Z-Z_1$ | 70 | 13 | 7.7 | 0.3 | 85 |
| $Z-Z_1$ | 80 | 13 | 6.8 | 0.2 | 85 |
| Z | 50 | 32.5 | 17.0 | 0.5 | 210 |
| Y | 60 | 25.75 | 13.85 | 0.4 | 168 |
| $Z_5$ | 80 | 13 | 6.8 | 0.2 | 85 |

[1] Viscosity of epoxy resin at 40% NV in 2-butoxy ethanol
[2] MAA = Methacrylic Acid
[3] ST = Styrene
[4] EA = Ethyl Acrylate

EXAMPLE 15

Epoxy Phosphate Synthesis

Procedure A

The epoxy phosphate was prepared according to the following procedure: 1005 gms. of epxoy resin (DER-333) and 340.5 gms. of bisphenol-A and 178 gms. of butyl cellosolve were heated to 140° C. in a 5 L round bottom flask equipped with stirrer, condenser and thermometer. When the temperature was at 140° C., the heat was turned off and the exotherm raised the temperature to 188° C. After the exotherm was peak, the batch was kept at 175° C. for an additional 5 hours. Periodic testing for viscosity and percent oxirane was made. Target oxirane value was about 2.28% and viscosity at 40% non-volatile between I-J. When these values were obtained, 227 gms. of butyl cellosolve were added, and the batch was cooled to 120° C. When the batch temperature was at 120° C., a mixture of 63.64 gms. of 85% phosphoric acid and 20 gms. of butyl cellosolve was added dropwise. The exotherm raised the batch temperature to 145° C. The batch was cooled to 120° C. and held for a half hour. Twenty-seven gms. of water were added to the reaction mixture and the batch was held at 120° C. for an additional 4 hours. After the hold, 241 gms. of butanol, 78 gms. of butyl cellosolve, 122.5 gms. of dimethylethanolamine and 2,500 gms. of deionized water were added respectively. The final mixture was agitated for 2 hours to obtain a stable emulsion.

Procedure B

Epoxy phosphate was produced by adding 816 gms. of epoxy resin (DER-333), 384 gms. of bisphenol-A, and 163 gms. of butyl cellosolve in a 5 L round bottom flask equipped with a stirrer, condenser, and thermometer and heated to 140° C. When the temperature was at 140° C., the heat was turned off and the exotherm raised the temperature to 155° C. After the exotherm was peak, the heat was turned back on to keep the temperature at 175° C. for an additional 2 hours. Periodic testing for viscosity and percent oxirane were made. Oxirane value was about 0.87% and the viscosity was X-Y at 40% NV in butyl cellosolve. When these values were obtained, 163 grams of butyl cellosolve were added, and the batch was cooled to 125° C. Mixture of 14.2 gms. of polyphosphoric acid (FMC) and 50 gms. of butyl cellosolve was added over 45 minutes, 30 gms. of extra butyl cellosolve was added as line rinse. The batch was held at 120° C. for 1 hour. Then 23 gms. of DI water were added to the reaction mixture and the held batch was at 120° C. for an additional 2 hours. After the hold time, the heat was turned off and 203 gms. of butanol were added over 8 minutes. 1550 gms. of DI water and 17.4 gms. of dimethyl ethanolamine were heated in a letdown container to 60° C. The above resin was dropped slowly into water amine mixture to form a stable emulsion. The resulting emulsion was adjusted to 25% NV by adding 1000 grams of DI water and stirring continued for 2 hours to insure an homogeneous mixture.

In accordance with the Procedure A or B, various epoxy phosphates were produced with the following molecular weight variation.

TABLE 4

| Molecular Weight | % Oxirane | % Acid | % NV | Emulsion |
|---|---|---|---|---|
| 9410 | 0.34 | 0.35 | 30.3 | Good |
| 6150 | 0.52 | 0.39 | 34.4 | Good |
| 4000 | 0.80 | 0.92 | 34.9 | Good |
| 3080 | 1.04 | 0.92 | 32.8 | Good |
| 2500 | 1.26 | 2.30 | 23.0 | Good |
| 1400 | 2.28 | 4.20 | 22.4 | Good |

EXAMPLE 16

Polymeric Blend

About 860 gms. of latex from Example 1 were added to a 5 L reaction flask along with additional deionized water to provide a NVM of about 23%. This mixture was agitated slowly to avoid foaming for about 15 minutes. Thereafter, a premix of 15.5 grams of DMEA and 82.8 gms. of water were added with continued agitation for about 30 minutes. About 72.8 grams of butoxy ethanol were added and agitated for 30 minutes. Thereafter, about 220.8 grams of epoxy phosphate from Example 15 and 815 grams of epoxy acrylic copolymers from Example 14 were added slowly over a time period of about 1 hour. The 259.3 grams of n-butanol were added and blended with increased agitation for about 15 minutes. Then about 31.3 grams of aminoplast resin Cymel 303 were added and mixed in for about 15 minutes. About 68.1 grams of deionized water were added followed by additional mixing of about 1 hour and then filtered.

The resulting polymeric mixture provided an excellent spray applied coating on the interior of cans.

To demonstrate the effect of changing the compositions of epoxy phosphate, latex, and epoxy acrylic copolymers, several blend compositions are shown in Table 5. The epoxy phosphate was Example 15, the epoxy acrylic was Example 14 (a) and the latices were from Examples 1-10.

TABLE 5

| % BY SOLID CONTENT | | | COATING PROPERTIES | | | |
|---|---|---|---|---|---|---|
| Epoxy Phosphate | Latex | Epoxy Acrylic | Spray Result | MEK Rubs | Water Resistance | Porosity |
| 0 | 75 | 25 | Good | Pass | Fair | Fair |
| 5 | 80 | 15 | Good | Pass | Good | Good |
| 10 | 80 | 10 | Good | Pass | Good | Good |
| 15 | 80 | 5 | Good | Pass | Good | Good |
| 20 | 80 | 0 | Poor | Pass | Good | Good |
| 5 | 90 | 5 | Fair | Pass | Good | Good |
| 10 | 75 | 15 | Good | Pass | Good | Good |
| 0 | 90 | 10 | Fair | Fail | Poor | Poor |
| 10 | 60 | 30 | Good | Pass | Fair | Fair |
| 10 | 40 | 50 | Good | Pass | Good | Good |
| 8 | 84 | 8 | Good | Pass | Good | Good |
| 5 | 85 | 10 | Fair | Pass | Good | Good |
| 5 | 95 | 0 | Poor | Pass | Fair | Fair |
| 30 | 10 | 60 | Good | Pass | Good | Good |
| 40 | 20 | 40 | Fair | Pass | Good | Good |
| 50 | 30 | 20 | Fair | Pass | Good | Good |
| 28 | 30 | 42 | Good | Pass | Good | Good |

EXAMPLE 17

Polymeric Blend for Coating

In a manner similar to Example 16, a coating composition was prepared as follows. About 1031 gms. of latex from Example 13 were added to a 5 L reaction flask along wit 922 gms. of deionized water. This mixture was agitated slowly to avoid foaming. A premix of 18.7 gms. of DMEA and 40.0 gms. of water were added with continued agitation for about 30 minutes. Then 73.6 gms. of butoxy ethanol were added and agitated for 30 minutes. Thereafter, 263.7 gms. of n-Butanol were added and blended with increased agitation for about 15 minutes. Then 354.0 gms. of epoxy acrylic copolymers from Example 14 and 183.0 gms. of epoxy phosphate from Example 15 were added slowly over a time period of about 1 hour. To the resulting polymeric mixture, 31.3 gms. of amino-plast resin Cymel 303 was then added to provide an excellent sprayable can coating composition particularly useful for spray application to interiors of beverage cans. Coating spray applied to cans were heat cured and provided excellent cured interior can coatings.

EXAMPLE 18

Polymeric Blend for Coating

In a manner similar to Example 16 a coating composition was prepared as follows. About 1000 gms of latex from Example 1 were added into a 5 L reaction flask with slight agitation. A premix of 18.1 gms. of DMEA and 37 gms. of water were added slowly to the latex with continued agitation. About 226 gms. of BuOH were added over a period of 1 hour. Thereafter, about 711 gms. of epoxy acrylic copolymers from Example 14 were added over 15 minutes. Then about 72.5 gms. of butoxy ethanol were added and followed by 900 gms. of deionized water. The mixture was agitated continuously for an additional 1 hour. The resulting polymeric mixture was mixed with an aminoplast crosslinking agent to obtain an excellent spray applied coating for the interior of cans. Spray applied coatings to cans were cured and provided excellent interior can coatings.

EXAMPLE 19

Polymeric Blend for Coating

In a manner similar to Example 16, a coating composition was prepared as follows. About 1000 gms. of latex from Example 13 were added to 770 gms. of deionized water in a 5 L reaction flask with slow agitation. A premix of 18.4 gms. of DMEA and 100 gms. of water were added with continued agitatin for about 30 minutes. Then a premix of 72 gms. of butoxy ethanol, 226 gms. of n-butanol, and 130 gms. of water were added and blended for 30 minutes. About 716.8 gms. of epoxy acrylic copolymers from Example 15 were added over 30 minutes and followed by 32.8 gms. of aminoplast resin Cymel 303 and 80 gms. of water. The resulting polymeric mixture was agitated for another 2 hrs. for complete mixing. The resulting coating was spray applied to interiors of cans and heat cured to produce an excellent interior can coating.

EXAMPLE 20

Polymeric Blend for Coating

In a manner similar to Example 16, a coating composition was prepared as follows. A mixture of 500 gms. of latex from Example 1 and 500 gms. of deionized water were loaded into a 5 L reaction flask. A premix solution of 10 gms. DMEA and 100 gms. of deionized water were added to latex over 30 minutes. Then 243.0 gms. of epoxy phosphate from Example 15 and 1326.1 gms. of epoxy acrylic copolymers from Example 14 were added with increased agitation over 1 hour. About 87 gms. of n-butanol and 30.5 gms. of Cymel 303 were added and followed by 340 gms. of deionized water. The final polymeric mixture was agitated for another hour. The coatings from this process provided excellent spray applied coatings. The cured films exhibited excellent film integrity properties.

EXAMPLE 21

Preparation of Epoxy-Acrylic Ester Graft Copolymer (a) Epoxy resin. To a 12-liter round-bottomed, 4-necked flask was charged 4144 g. of a liquid spray resin, DER 333 (from Dow Chemical Company, Midland, Mich.), 2135 g. of bisphenol A, and 409 g. of 2-butoxy-ethanol-1. A water-cooled condenser was placed on one neck of the flask, an air driven mechanical stirrer was placed through the second neck, and a nitrogen feed was placed through the third, and a thermometer was placed through the fourth neck of the flask. Heating was started and the mixture in the flask was stirred under a vacuum of 15 inches. The temperature was raised to 140° C. whereupon the heating and vacuum were discontinued. About 40 g. of a volatile was collected comprising water, xylene, (from DER 333) and 2-butoxy-ethanol-1. The exotherm carried the reaction temperature to about 175° C., where it was held for 5 hours. The viscosity of the epoxy resin after one hour was Y Gardner-Holt (40% solution in 2-butoxyethanol-1), Y+ after 3 hours, and Z after 5 hours. At the end of the 5-hour hold, 1012 g. of 2-butoxy-ethanol-1 was added, and the epoxy solution was let to cool to room temperature.

(b) Acrylic terpolymer. To a 12 liter 4-necked round-bottomed flask was charged 5503 g. of n-butanol. Through the 4 necks were placed a water cooled condenser, an air-driven mechanical stirrer, a thermometer-nitrogen inlet line and monomer addition funnel. The solvent was heated to 113° C. A monomer mixture of 1764 g. of methacrylic acid, 924 g. of styrene, 26 g. of ethyl acrylate, 182 g. of benzoyl peroxide was slowly added to the refluxing solvent. The addition took 2 hours, and the reaction mixture was held at 114° C. for another hour before cooling to room temperature. The non-volatile of the reaction mixture was 34.7.

Epoxy-Acrylic Ester Graft Copolymer

Into a 5-liter round-bottomed, 4-necked flask was charged 1306 g. of epoxy resin (a), and 694 g. of the acrylic resin (b). The reaction mixture was stirred under nitrogen sparge and heated to 105° C. and held at that temperature for 4 hours. At the end of the hold, 23.6 g. of dimethylethanol amine and 144 g. of 2-butoxyethanol-1 were added in 4 minutes, and the reaction mixture was held at 102°–105° C. for ½ hour. The viscosity of the resin is U 1/4, (from 1 part resin, 1 part pyrol). Into a 2 gallon stainless steel container was charged 2043 g. of deionized water and 86.1 g. of dimethylethanol amine. The container was heated so that the temperature of the water was 50° C. before 1500 g. of the resin from the 5-liter flask was dropped into the agitated water. An emulsion formed easily and the non-volatile of the emulsion was 23.5%, viscosity Ford #4 cup 38 seconds, acid number 34.1 and base number 76.4.

Binder Composition

A binder composition was produced by mixing the following:
1200 grams of emulsion copolymer of Example 1
893 grams of deionized water
21.7 grams dimethyl ethanolamine
86.8 grams of deionized water 106.7 grams of 2-butoxy-ethanol-1
225.5 grams of epoxy phosphate
284.3 grams Epoxy-acrylic Ester Graft Copolymer from above
363.6 grams of n-butanol
32.7 grams of Cymel 303
400.5 grams of deionized water The foregoing blend was evaluated as an interior can coating. NVM was 18.8%; viscosity was 15 seconds #4 Ford cup; Acid No.=35.5; base No.=29; percent neutralization was 81.7%; organic solvent/solids ration was 0.9; 2-butoxy-ethanol-1/n-butanol ratio was 30/70; and Cymel was 5% based on solids.

The coating formed a clear continuous coating upon air drying as well as upon baking. The coating had a wedge bend failure of 24%; pasturization at 170° F. for 10 minutes produced a slight blush; blush adhesion was excellent; porosity ratio less than 1; MEK rubs of 24 overall; and general film properties were excellent.

EXAMPLE 22

Preparation of Epxoy-Acrylic Graft Quaternary Ammonium Copolymer

High molecular weight epoxy resin was prepared by reacting 438 g. of Epon 828 (liquid epoxy resin, Bisphenol type from Shell Chemical Co., Houston, Tex.), 248 grams (g.) of Bisphenol A in 125 g. of 2-butoxy-ethanol-1 and 23 g. of xylene. 0.32 g. of sodium acetate trihydrate in 3.6 g. of water was now added. The reaction mixture was charged into a 12-liter 4 necked round bottom flask. Through one neck was placed an air driven mechanical stirrer, through another neck a water cooled condenser, through the third neck a thermometer and a nitrogen inlet, and the fourth neck an addition funnel, heating was provided by a heating mantle. When the temperature reached 140° C., heating was stopped and the exotherm carried the temperature of the reaction mixture to 175° C. The temperature was held at 175° C. for five hours. At the end of the hold, the viscosity of the epoxy resin (40% solution in 2-butoxy-ethanol-1) was A1-Z2 (Gardner Holt viscosity). Heating was stopped and 484 g. of n-butanol was carefully added. The temperature at the end of the butanol addition was about 115° C. A monomer mixture consisting of methacrylic acid 114 g., styrene 60 g., ethyl acrylate 1.6 g., benzoyl peroxide (78% active in water) and 45 g. of 2-butoxy-ethanol-1 was added to the epoxy resin in two hours, the temperature was held at 115° C. After the monomer mixture was added, 25 g. of n-butanol was used to rinse the addition funnel and then added to the reaction mixture which was held at 115° C. for another hour. A second monomer mixture coinsisting of 888 g. of styrene, 350 g. of ethyl acrylate, 186 g. of methacrylic acid, 36.4 g. of benzoyl peroxide (78% active in water), 289 g. of 2-butoxy-ethanol-1 and 148 g. of n-butanol was slowly added to the epoxy-acrylic graft copolymer at 115° C. The addition took 3 hours, and the reaction mixture was held at 115° C. for another half hour before 719 g. of n-butanol was added. Mixture was cooled from 115° to 85° C. whereupon 450 g. of epoxy resin Epon 828 was slowly added to the reaction mixture and then held for ½ hour at 90° C. Then 80 g. of dimethylethanol amine and 50 g. of water were added and the reaction mixture was held at 80° C. for 1 hour. Then 29 g. of dimethylethanol was added to obtain a dispersion of 20% NVM. The resultant copolymer was believed to be an epoxy-acrylic graft containing quaternary ammonium functionalities. The boiling Joy and porisity of the film was drastically improved.

EXAMPLE 23

Self-curing NiBMA copolymer by suspension polymerization (a) To a 5 liter round-bottom 4-necked flask was charged 2211 g. of deionized water. The flask was fitted with nitrogen inlet, thermometer, water cooled condenser and air driven mechanical stirrer. The water was heated to 60° C. before 110 g. of Vinol 523 (polyvinyl alcohol from Air Products and Chemical, Wayne, Pa.) was added and let dissolved for about 20 minutes. A monomer mixture consisted of 544 g. of styrene, 435 g. of ethyl acrylate, 54.5 g. of methacrylic acid and 64 g. of NiBMA (N-isobutoxy methyl acrylamide) monomer (85% in isobutanol) and 13 g. of lauroyl peroxide was batch added to the aqueous solution at about 70° C. and the polymerization was carried out at 70° C. for about 5 hours. At the end of that time, the polymerization mixture was let cool to room temperature. The nonvolatile of the suspension was determined to be 29.2% and the viscosity by Ford #4 was 25 seconds.

A blend of suspension polymer (a), epoxy-acrylic graft copolymer (Example 14a), and epoxy phosphate (Example 15) was prepared as follows.

Into a 5-liter 4-necked round-bottomed flask was charged 1000 g. of the suspension polymer (a) and 754.5 g. of deionized water. The flask was fitted with nitrogen inlet, thermometer, water cooled condenser and an air driven-mechanical stirrer. The mixture was heated to 38° C., and 18 g. of dimethylamino ethanol and 83.6 g. of deionized water were added. The temperature was increased to 48° C. and mixing was continued for 15 minutes. Then 55.9 g. of 2-ethoxy-butanol-1 was added followed by 2.8 g. of deionized water. The mixture was stirred for 40 minutes at 43° C. whereupon 200.3 g. of an epoxy-phosphate (Example 15) was added in 30 minutes followed by 68.2 g. of deionized water over 15 minutes. Then 378.1 g. of epoxy-acrylic graft copolymer was added over 30 minutes followed by 77.1 g. of deionized water over 5 minutes. Then 168.4 g. of n-butanol was added in 10 minutes followed by addition of 29.1 g. of Cymel 303. Additional n-butanol of 55.2 g. was added over 15 minutes followed by the addition of 205.4 g. of deionized water. The non-volatile of the blend was 15.1%, and viscosity Ford #4 cup was 13 seconds. A film drawn down on a glass plate followed by baking over a hot plate at 380° F. for 5 minutes provided a smooth coating.

EXAMPLE 24

Blend Comprising Epoxy-Acrylic Graft Copolymer containing Phosphated Monomer

A 5 L flask equipped with a stirrer, a thermometer, a condenser, and a $N_2$ inlet was charged with 434.5 gms. of 2 butoxy ethanol and heated to 150° C. When the temperature was at 150° C. 1000 gms. of solid epoxy resin (Epon 1009F) was added slowly to dissolve in the solvent. When all the epoxy resin was dissolved, the temperature was lowered to 115° C. and 507.7 gms. of n-butanol was slowly added to maintain the temperature at 115° C. A mixture of 159.1 gms. of methacrylic acid, 83.2 gms. of styrene, 2.3 gms. of ethyl acrylate, 25.6 gms. of glycidyl methacrylate phosphate, 21.7 gms. of benzoyl peroxide and 62.4 gms. of 2-butoxy ethanol was added to the epoxy solution over 1½ hours. After all the monomer mixture was added, 34.9 gms. of n-butanol was used to rinse the addition funnel. The reaction mixture was kept at 115° C. for 3 hours to complete the polymerization. The resin was then fed into an agitated reducing vessel containing a mixture of 2550 gms. of deionized water and 103 gms. of DMEA. The temperature of the resulting blend was 50° C. It was held there for about an hour, then the blend was cooled to below 32° C. by adding 100 gms. of the cool deionized water. The phosphated epoxy-acrylic graft copolymer was blended with emulsion copolymer from Example 1 to produce an excellent spray applied interior can coating.

EXAMPLE 25

Blend containing Epoxy Acrylic Melamine Graft Copolymer

About 125 gms. of emulsion copolymer from Example 1 were added to a 5 L flask along with 112.5 gms. of deionized water. This mixture was agitated slowly for about 15 minutes. A premix of 1.3 gms. of dimethyl amino ethanol amine and 12.5 gms. of deionized water were added with continued agitation. Then 9.5 gms. of 2-butoxy ethanol was added and followed by 25.2 gms. of epoxy phosphate from Example 15 and 56.4 gms. of epoxy acrylic melamine graft produced according to Example 1 in U.S. Pat. No. 4,289,811. Thereafter, 28.5 gms. of n-butanol and 3.7 gms. of aminoplast resin, Cymel 303, were added and mixed very well. A mixture of 0.5 gms. of DMEA and 3.7 gms. of deionized water was then added and mixed for 1 hour. The resulting polymeric mixture provided an excellent spray applied coating on the interior of cans.

EXAMPLE 26

Blend contaning Phosphorylated Hydroxy Terminated Polybutadiene

To a suitable reactor 184 parts of hydroxy terminated polybutadiene (Hycar 1300×29 by B. F. Goodrich) were added and 79 parts of 2-butoxy ethanol. Heating and agitation were begun with $N_2$ sparge and at 50° C. a mixture of 1.84 parts of super phosphoric acid and 44 parts of 2-butoxy ethanol was added slowly over 11 minutes. The temperature of the reactants was retained at 125° C. for 25 minutes. At the end of this hold period, 3.7 parts of water was added and the temperature of the reaction mixture was retained at 125° C. for 2 hours. At the end of the hold period, the temperature was lowered to 75° C. and 3.7 parts of dimethyl amino ethanol amine was added and followed by 303.2 parts of water. One hundred and ten parts of 2-butoxy ethanol was then added and followed by 25 parts of butanol. Twenty six parts of DMEA was added and 200 parts of water was then added to adjust to the required solid.

Blend Composition

To a 5 L reaction flask, 1000 gms. of water dispersed copolymer from Example 13 were added along with 754 gms. of water. This mixture was agitated slowly for 15 minutes. A premix of 18 gms. of DMEA and 200 gms. of water were added with continued agitation. The 341.7 gms. of polybutadiene phosphate from the example above was added and rinsed by 17 gms. of water. Thereafter, 379.1 gms. of epoxy acrylic copolymer from Example 14 were added and rinsed by 19 gms. of water. Next, 228.7 gms. of n-butanol was added slowly and followed by a mixture of 8.73 gms. of butanol and 29.1 gms. of Cymel 303. To adjust the mixture to required solid content, 63.4 gms. of water was added. The resulting mixture formed good film for spray applied coatings.

EXAMPLE 27

Blend Containing Phosphorylated Polyester

A conventional polymerization vessel equipped with a stirrer, condenser and water separator, thermometer, and a nitrogen inlet was charged with a tall oil fatty acid (Sylfat V-18) and heated up to 80° C. When the temperature was at 80° C., 5120 gms. of a resinous polyol (RJ-101 from Monsanto) was added and continued to heat-up to 125° C. A vacuum of 18" was needed to pull out water which was trapped in RJ-101. The reaction mixture was heated to 240° C. and xylene was added, as needed, to aid the removal of water. The temperature was maintained at 240° C. for 2½ hours and the acid number was 3.9 on solid. The heat was turned off and the reaction mixture was cooled to 120° C. When the temperature was at 120° C., 1567 gms. of acetone was added very slowly. When all the addition was finished, the temperature of the batch was 51° C.

The resulting polyester was phosphorylated as follows: A conventional vessel equipped with a stirrer, condenser, and a thermometer was charged with 386.1 gms. of resin from above. At 25° C. 15 gms. of $P_2O_5$ solid was added with stirring. The reaction mixture was heated up to 125° C. and 79 gms. of 2-butoxy ethanol was added to dilute to 77.9% solid. This phosphorylated polyester was then added to a water dispersed copolymer (Example 13) and epoxy-acrylic copolymer (Example 14) to produce a good coating for spray application to interior of cans.

EXAMPLE 28

Synthesis of Phosphated Epoxy-Acrylic Graft Copolymer

An epoxy phosphate acrylic copolymer was made as follows. 1141 gms. of 95% Epon 828 in xylene, 614 gms. of bisphenol A, and 310 gms. of 2-butoxy ethanol was charged into a 5 l. flask equipped with a stirrer, a thermometer, a $N_2$ inlet, a condenser and additional funnel. The mixture was heated to 90° C. with $N_2$ sparge, when the temperature was at 90° C., a mixture of 0.52 gm. of sodium acetate and 3 gms. of water was added, and the heat was continued to 140° C. When the temperature reached 140° C., the heat was turned off. The exotherm raised the temperature to 160° C. The heat was turned back on to raise the temperature to 175° C. The reaction mixture was held at 175° C. for five hours and cooled down to 125° C. by adding 360 gms. of 2-butoxy ethanol. When the temperature was at 125° C., a mixture of 7.32 gms. of polyphosphoric acid and 20 gms. 2-butoxy ethanol was added slowly and held for 30 minutes. Thirty-four gms. of water was then added slowly to the reaction mixture and held at 125° C. for two hours. After the two hours hold, 888 gms. of BuOH was added to the reaction mixture and the temperature was dropped to 113° C. A mixture of 283 gms. of methacrylic acid, 148 gms. of styrene, and 4 gms. of ethyl acrylate, 38.5 gms. of benzoyl peroxide and 32.4 gms. of 2-butoxy ethanol was added over two hours and then the reaction mixture was held at 114° C. for additional two hours. The resulting resin was then dropped into the mixture of 3867 gms. of DI water and 162 gms. of dimethyl ethanolamine. The phosphated epoxy-acrylic graft copolymer was mixed with a latex (Example 13).

The resulting emulsion was a stable opalescence emulsion which gave good protective coating for steel can in softdrink application when cured with 5% Cymel 303.

EXAMPLE 28A

A. Hydroxy Phosphate Monomer

One hundred two g. (1.00 moles) of superphosphoric acid was dissolved into 250 g. tetrahydrofran and colled to 10° C. 156.2 g. (1.10 moles) of glycidyl methacrylate was then added over 3–4 hours under vigorous agitation. The reaction mixture was allowed to warm to room temperature, and then stirred an additional 4 hours. Excess solvent was evaporated and the monomer stored at 0° C. until use.

B. Solution Acrylic Containing Phosphate Monomer

Two hundred fifty-eight g. of butyl cellosolve and 602 g. of n-butanol were heated to 120° C. under Nitrogen sparge with agitation in a 4 neck round bottomed flask fitted with addition funnel, thermometer, and condenser. A mixture of 980 g. styrene, 900 g. ethyl acrylate, 100 g. methacrylic acid, 20 g. phosphate monomer and 20 g. BPO (benzoyl peroxide) were added over 4 hours. After all the monomers had been added, the batch was held at 115° C. for 5–6 hours during which time additional benzoyl peroxide was added to complete the conversion to produce a phosphate polymer useful in a polymeric mixture in accordance with this invention.

EXAMPLE 29

Preparation of Water Soluble Dispersion

A 5 L flask equipped with a thermometer, a condenser, a stirrer, and a N₂ inlet was charged with a mixture of 1000 gms. of DI water and 114.6 gms. of dimethyl aminoethanol. The mixture was heated to 85° C. A monomer mixture containing 548 gms. of styrene, 487.1 gms. of ethyl acrylate, 121.7 gms. of methacrylic acid, 24.3 gms. of benzoin, 379.5 gms. of butyl cellosolve, 379.5 gms. of n-butanol, 60.9 gms. of N(isobutoxy methyl) acrylamide, and 34.8 gms. of tert-butyl hydroperoxide was added over 4 hrs. When the addition of monomer mixture was completed, the reaction mixture was held at 85° C. for 1 hour. Then, 900 gms. of DI water was added and followed by a mixture of 100 gms. of DI water and 34.8 gms. of tert-butyl hydroperoxide. The reaction mixture was held at 85° C. for another 2 hus. to complete the polymerization.

Blend Composition

To a 5 L flask equipped with a condenser and a stirrer, 1514 gms. of water soluble dispersion from the foregoing water soluble dispersion were added along with 463 gms. of DI water. The mixture was mixed for 15 minutes. Next, 200.3 gms. of epoxy phosphate from Example 15 was added and rinsed with 200 gms. of DI water. The resulting mixture was mixed for 1 hr., then 379.1 gms. of epoxy acrylic copolymers from Example 14 was added and rinsed with 200 gms. of DI water. The mixture wa stirred for 1 hr. A mixture of 13 gms. of n-butanol and 29.1 gms. of Cymel 303 was then added and followed by 100 gms. of DI water. The resulting mixture was mixed for 2 hrs. and then filtered.

The resulting polymeric mixture was cured and provided a good interior can coating.

We claim:

1. A water-dispersed coating composition comprising a polymeric blend on a polymer solids weight basis:
between 5% and 99% of a self-curing water dispersed polymer comprising copolymerized ethylenically unsaturated monomers comprising (a) alkylol acrylamide monomer, (b) ethylenically unsaturated functional monomer containing reactive functional groups and selected from carboxyl, hydroxyl, amine, or amide functional monomers, and (c) other ethylenically unsaturated monomer, said monomers copolymerized in water to produce polymer particles wherein said alkylol acrylamide monomer is preferentially copolymerized on the surface portion of said polymer particles;
between 1% and 70% epoxy-acrylic graft copolymer; and
between 0% and 50% of a phosphated polymer.

2. The composition in claim 1 wherein the composition comprises on a weight basis between 40% and 90% said self-curing polymer, between 1% and 30% said epoxy-acrylic copolymer, and up to 30% of said phosphated polymer.

3. The composition in claim 1 wherein the composition contains between 3% and 20% phosphated polymer.

4. The composition in claim 1 wherein the composition contains between 1% and 10% aminoplast resin.

5. The composition in claim 1 wherein the alkylol acrylamide monomer is preferentially copolymerized on the surface portion of said polymer.

6. The composition in claim 1 wherein the self-curing water dispersed polymer is an emulsion polymerized polymer.

7. The composition in claim 6 wherein the emulsion polymerized polymer is a latex.

8. The composition in claim 1 wherein the self-curing water dispersed polymer is a resinous polyelectrolyte polymer produced by polymerizing said monomers in water containing ionizing agent for ionizing the functional groups of said functional monomer.

9. The composition in claim 1 wherein the epoxy-acrylic copolymer comprises an epoxy-acrylic graft copolymer.

10. The composition in claim 9 wherein the epoxy-acrylic graft copolymer comprises a mixture of epoxy-resin, epoxy-acrylic graft polymer, and ungrafted addition polymer produced by in-situ polymerization of ethylenically unsaturated monomers including carboxyl monomers in the presence of epoxy resin and activated by at least 3% peroxide catalyst based on the weight of said ethylenically unsaturated monomers.

11. The composition in claim 9 wherein the epoxy-acrylic graft copolymer comprises a phosphated epoxy-acrylic graft copolymer.

12. The composition in claim 1 wherein the epoxy-acrylic copolymer is a phosphated epoxy-acrylic copolymer.

13. The composition in claim 1 wherein the epoxy-acrylic copolymer is an epoxy-acrylic ester graft copolymer.

14. The composition in claim 13 wherein the epoxy-acrylic ester graft copolymer is a phosphated copolymer.

15. The composition in claim 13 wherein the epoxy-acrylic ester graft copolymer is produced by reacting epoxy resin with a preformed acrylic copolymer containing carboxylic acid groups in the presence of sufficient amine to produce a non-gelled epoxy-acrylic ester graft copolymer.

16. The composition in claim 15 wherein the epoxy resin is reacted with a preformed acrylic copolymer in the presence of at least 2% by weight amine based on the weight of reactants.

17. The composition in claim 1 wherein the epoxy-acrylic copolymer is produced by reacting epoxy resin with a melamine graft copolymer mixture of melamine and acrylic copolymer in the presence of sufficient amine to produce a non-gelled epoxy-acrylic ester graft copolymer.

18. The composition in claim 17 wherein the epoxy-acrylic graft copolymer is phosphated.

19. The composition in claim 1 wherein the phosphated polymer comprises a phosphated epoxy resin.

20. The composition in claim 19 wherein the composition contains between 3% and 15% of phosphated epoxy resin.

21. The composition in claim 1 wherein the phosphated polymer comprises a phosphated ester of an alkyl alcohol.

22. The composition in claim 1 wherein the phosphated polymer comprises a phosphated resinous polyelectrolyte polymer produced by reacting ethylenically unsaturated monomer including carboxyl or hydroxyl functional monomer in water containing an ionizing agent.

23. The composition in claim 1 wherein the phosphated polymer comprises phosphated epoxidized oil.

24. The composition in claim 1 wherein the phosphated polymer comprises phosphated epoxidized polybutadiene copolymer.

25. The composition in claim 1 wherein the phosphated polymer comprises phosphated addition copolymer containing copolymerized phosphate monomer.

26. The composition in claim 1 wherein the phosphate polymer comprises phosphated addition polymer of polymerized ethylenic monomers wherein said monomers include glycidyl acrylate or methacrylate monomer.

27. The composition in claim 1 wherein the phosphated polymer comprises a phosphated polyester.

28. The composition in claim 1 wherein the phosphated polymer comprises a phosphated epoxy-acrylic copolymer.

29. The composition in claim 1 wherein the phosphated polymer comprises a phosphated epoxy-acrylic graft copolymer.

30. The composition in claim 1 wherein the phosphated polymer comprises a phosphated epoxy-acrylic ester graft copolymer.

31. The composition in claim 1 wherein the phosphated polymer comprises a phosphated epoxy-acrylic melamine graft copolymer mixture.

32. The composition in claim 1 wherein the phosphated polymer comprises a phosphated epoxy-acrylic copolymer.

33. In a process for producing an organic coating composition comprising the process steps of:
polymerizing in water a monomer mixture comprising ethylenically unsaturated monomers comprising (a) alkylol acrylamide monomer, (b) ethylenically unsaturated functional monomer containing reactive functional groups selected from carboxyl, hydroxyl, amine, or amide functional monomers, and (c) other ethylenically unsaturated monomer to provide a self-curing water dispersed polymer; and
mixing said self-curing water dispersed polymer with an epoxy-acrylic graft copolymer and a phosphated polymer to provide a water-dispersed composition of a blend of polymers comprising between 1% and 99% of said self-curing polymer, between 1% and 70% of said epoxy-acrylic graft copolymer, and 0% to 50% phosphated polymer.

34. The process in claim 33 wherein the monomers for the self-curing polymer are polymerized in an emulsion process to produce the water dispersed self-curing polymer.

35. The process in claim 33 wherein the monomers for the self-curing polymers are polymerized in the presence of ionizing agent to produce a resinous polyelectrolyte water dispersed self-curing polymer.

36. The process in claim 33 wherein the alkylol acrylamide monomer is preferentially copolymerized on the surface portion of the self-curing water dispersed polymer.

37. The process in claim 36 wherein the process is a two-step process for polymerizing monomers, and the alkylol acrylamide monomer is polymerized in the second step to produce a self-curing water dispersed polymer.

38. The process in claim 37 wherein the second stage monomers include a functional monomer.

39. The process in claim 33 wherein said ethylenically unsaturated monomers for the self-curing polymer comprise by weight between 1% and 20% alkylol acrylamide monomer, between 1% and 20% functional monomer, and the remaining being other ethylenic monomer.

40. The process in claim 33 wherein the functional monomer is selected from carboxyl monomer, hydroxyl monomer, amine monomer, or amide monomer.

41. The process in claim 33 wherein the alkylol acrylamide monomer is copolymerized at temperatures above 70° C.

42. The process in claim 41 wherein the process is a two-step process and alkylol acrylamide monomer is copolymerized in the second step.

43. The process in claim 47 wherein a portion of the functional groups on said functional monomer reacts with a portion of the functional groups on said alkylol acrylamide monomer.

44. The process in claim 33 wherein between 1% and 10% by weight aminoplast resin is added to increase the curing rate of the coating composition.

45. The process in claim 33 wherein the epoxy-acrylic copolymer comprises an epoxy-acrylic graft polymer produced by polymerizing ethylenically unsaturated monomers including carboxyl monomers in the presence of epoxy resin and in the presence of at least 3% peroxide catalyst based on the weight of ethylenic monomers.

46. The process in claim 33 wherein the epoxy-acrylic graft polymer is phosphated.

47. The process in claim 33 wherein the epoxy-acrylic copolymer is an epoxy-acrylic ester graft polymer produced by reacting epoxy resin with preformed acrylic copolymer in the presence of sufficient amine to produce a non-gelled epoxy-acrylic ester polymer.

48. The process in claim 47 wherein amine is used at the level above 2% by weight based on reactants.

49. The process in claim 47 wherein the epoxy-acrylic ester graft polymer is phosphated.

50. The process in claim 47 wherein the preformed acrylic polymer is a graft polymer produced by polymerizing monomers in the presence of melamine.

51. The process in claim 33 wherein the phosphated polymer comprises phosphated epoxy resin.

52. The process in claim 33 wherein the phosphated polymer is an addition polymer produced by copolymerizing ethylenic monomers including a phosphated monomer.

53. The process in claim 33 wherein the phosphated polymer is an alkyl ester of phosphoric acid.

54. The process in claim 33 wherein the phosphated polymer is phosphated epoxidized oil.

55. The process in claim 33 wherein the phosphated polymer is a phosphated epoxidized polybutadiene.

56. The process in claim 33 wherein the phosphated polymer is a phosphated acrylic copolymer.

57. The process in claim 33 wherein the phosphated polymer is a phosphated polyester.

58. The process in claim 33 wherein the phosphated polymer is a phosphated epoxy-acrylic copolymer.

59. A water-dispersed coating composition comprising on a polymer solids weight basis:
 between 40% and 90% of a self-curing latex polymer particles comprising (a) copolymerized alkylol acrylamide monomer, (b) functional monomer containing reactive functional groups and selected from carboxyl, hydroxyl, amine, or amide functional monomers, and (c) other ethylenic monomer, wherein said alkylol acrylamide monomer is preferentially copolymerized on the surface portion of said polymer particles;
 between 1% and 30% of epoxy-acrylic copolymer mixture comprising epoxy resin, epoxy-acrylic graft copolymer, and ungrafted addition polymer, produced by in-situ polymerization of ethylenically unsaturated monomers including carboxyl monomer activated by at least 3% peroxide catalyst based on monomers, and in the presence of epoxy resin; and
 between 0% and 30% epoxy phosphate resin.

60. The composition in claim 59 wherein the coating composition contains between 3% and 15% epoxy phosphate resin.

61. The composition in claim 60 wherein the coating composition contains on a polymer solids weight basis up to about 15% aminoplast resin.

62. The composition in claim 61 containing between 1% and 10% aminoplast resin.

63. The composition in claim 59 wherein the copolymerized alkylol acrylamide monomer is an alkylated alkylol acrylamide monomer.

64. The composition in claim 63 wherein the alkylol acrylamide monomer is a butylated alkylol acrylamide monomer.

65. In a process for producing an organic coating composition, comprising the steps of:
 providing a mixture comprising on a weight basis between 40% and 90% of a self-curing latex polymer between 1% and 30% of epoxy-acrylic copolymer mixture comprising epoxy resin, epoxy-acrylic graft copolymer, and ungrafted addition polymer, and between 0% and 30% epoxy phosphate resin;
 wherein the self-curing latex polymer is produced by polymerizing monomers comprising (a) alkylol acrylamide monomer, (b) functional monomer containing reactive functional groups selected from carboxyl, hydroxyl, amine, or amide functional monomers, and (c) other ethylenic monomer in a two-step process by first copolymerizing first stage monomer and then copolymerizing second stage monomer, wherein said alkylol acrylamide is a second stage monomer copolymerized in the second step to preferentially orientate alkylol acrylamide groups of said alkylol acrylamide monomer on the surface portion of the latex polymer particles, whereby said latex can be heat cured and self cross-linking by cross-linking said alkylol acrylamide groups with said functional groups.

66. The process in claim 65 wherein said ethylenically unsaturated monomers comprise by weight between 1% and 20% alkylol acrylamide monomer, between 1% and 20% functional monomer, and the remaining being other ethylenic monomer.

67. The process in claim 65 wherein the functional monomer is selected from carboxyl monomer, hydroxyl monomer, amine monomer, or amide monomer.

68. The process in claim 65 wherein the second stage monomers include a functional monomer.

69. The process in claim 68 wherein a portion of the functional groups on said functional monomer react with a portion of the functional groups on said alkylol acrylamide monomer.

70. The process in claim 65 wherein the coating is spray applied to a substrate, and said latex is heat cured to cross-link said functional groups with said alkylol acrylamide groups.

71. The process in claim 65 wherein between 1% and 10% by weight aminoplast resin is added to increase the curing rate of the coating composition.

72. A water-dispersed coating composition comprising a polymeric blend on a polymer solids weight basis:
 between 5% and 99% of a self-curing water dispersed polymer comprising copolymerized ethylenically unsaturated monomers comprising (a) alkyl modified acrylamide monomer derived from alkylol acrylamide monomer, (b) ethylenically unsaturated functional monomer containing reactive functional groups and selected from carboxyl, hydroxyl, amine, or amide functional monomers, and (c) other ethylenically unsaturated monomer, said monomers copolymerized in water to produce polymer particles wherein said alkylol acrylamide monomer is preferentially copolymerized on the surface portion of said polymer particles;
 between 1% and 70% epoxy-acrylic graft copolymer; and
 between 0% and 50% of a phosphated polymer.

73. The composition in claim 72 wherein the alkyl modified acrylamide monomer is a butylated modified acrylamide monomer.

74. In a process for producing an organic coating composition comprising the process steps of:
 polymerizing in water a monomer mixture comprising ethylenically unsaturated monomers comprising (a) alkyl modified acrylamide monomer derived from alkylol acrylamide monomer, (b) ethylenically unsaturated functional monomer containing reactive functional groups selected from carboxyl, hydroxyl, amine, or amide functional monomers, and (c) other ethylenically unsaturated monomer to provide a self-curing water dispersed polymer; and
 mixing said self-curing water dispersed polymer with an epoxy-acrylic graft copolymer and a phosphated polymer to provide a water-dispersed composition of a blend of polymers comprising between 1% and 99% of said self-curing polymer, between 1% and 70% of said epoxy-acrylic graft copolymer, and 0% to 50% phosphated polymer.

75. The process in claim 74 wherein the alkyl modified acrylamide monomer is a butylated modified acrylamide monomer.

76. A water-dispersed coating composition comprising on a polymer solids weight basis:

between 40% and 90% of a self-curing latex polymer particles comprising (a) copolymerized alkyl modified acrylamide monomer derived from alkylol acrylamide monomer, (b) functional monomer containing reactive functional groups and selected from carboxyl, hydroxyl, amine, or amide functional monomers, and (c) other ethylenic monomer, wherein said alkyl modified acrylamide monomer is preferentially copolymerized on the surface portion of said polymer particles;

between 1% and 30% of epoxy-acrylic copolymer mixture comprising epoxy resin, epoxy-acrylic graft copolymer, and ungrafted addition polymer produced by in-situ polymerization of ethylenically unsaturated monomers including carboxyl monomer activated by at least 3% peroxide catalyst based on monomers and in the presence of epoxy resin; and between 0% and 30% epoxy phosphate resin.

77. The composition in claim 76 wherein the alkyl modified acrylamide monomer is a butylated modified acrylamide monomer.

* * * * *